United States Patent [19]

Bowden et al.

[11] 3,725,414
[45] Apr. 3, 1973

[54] MANUFACTURE OF HALOGENATED PYRIDINE DERIVATIVES
[75] Inventors: Roy Dennis Bowden; Thomas Seaton, both of Runcorn, England
[73] Assignee: Imperial Chemical Industries Limited, London, England
[22] Filed: Aug. 16, 1971
[21] Appl. No.: 172,266

[30] Foreign Application Priority Data

May 4, 1971    Great Britain......................12,902/71
Aug. 19, 1970    Great Britain......................39,394/70

[52] U.S. Cl. ...........................................260/290 HL
[51] Int. Cl. ..............................................C07d 31/26

[58] Field of Search.......................................260/290

[56] References Cited

OTHER PUBLICATIONS

Houben-Weyl, Methoden der Organishen Chemie, Vol. 5/3 p. 727 (1962)

*Primary Examiner*—Harry I. Moatz
*Attorney*—Cushman, Darby & Cushman

[57] ABSTRACT

A process for the manufacture of a chloropyridine which comprises interacting -caprolactam with chlorine in the vapor phase at a temperature of at least 250°C.

7 Claims, No Drawings

MANUFACTURE OF HALOGENATED PYRIDINE DERIVATIVES

This invention relates to the manufacture of halogenated pyridine derivatives, and more particularly to the manufacture of chloropyridines.

Previously known methods of producing chloropyridines have relied upon the chlorination of a pre-formed pyridine ring. Chloropyridines and a wide range of compounds derived therefrom are known to have a variety of applications (for example in the preparation of herbicidal compositions) but the availability of these compounds has been somewhat restricted.

We have now found that chloropyridines may conveniently be produced by a process which does not require the use of pyridine itself as starting material; surprisingly we have found that chloropyridines may be prepared directly by chlorination of $\epsilon$-caprolactam or its isomer cyclohexanone oxime, starting materials which are established intermediates in the large-scale manufacture of Nylon-6.

Thus according to the present invention there is provided a process for the manufacture of a chloropyridine which comprises interacting $\epsilon$-caprolactam or cyclohexanone oxime with chlorine in the vapor phase at an elevated temperature.

The chlorination reaction is preferably carried out at a temperature of at least 250° C, preferably in the range from 400° to 600° C.

It is preferred to preheat separately the feed of chlorine and the feed of the caprolactam or cyclohexanone oxime.

The reactants may be diluted with inorganic diluents, for example nitrogen and/or steam, or with organic diluents, preferably inert towards chlorine, for example carbon tetrachloride. When a gaseous or volatile diluent is used the caprolactam or cyclohexanone oxime starting material may be vaporized in the stream of diluent vapor which serves as a carrier gas; when a liquid diluent is used, the caprolactam or cyclohexanone oxime material may be dissolved in the liquid diluent and the resulting solution may then be vaporized as a whole.

The process is especially applicable to the production of pentachloropyridine but chloropyridines containing fewer than five chlorine atoms may also be obtained, the proportion of such products depending upon the proportion of chlorine employed, the reaction temperature and the residence time.

In general, it is preferred to use at least 5 moles of chlorine per mole of caprolactam or cyclohexanone oxime. When pentachloropyridine is desired as the main product it is especially preferred to use at least 10 moles (for example from 15 to 30 moles) of chlorine per mole of caprolactam or cyclohexanone oxime. In general the upper limit to the proportion of chlorine will be governed by economic considerations.

The reaction may be carried out in the absence of a catalyst, but a catalyst may be present if desired, for example a porous material comprising silica, alumina (or a mixture or combination of silica and alumina) or carbon.

Convenient residence times of the mixture in the reaction zone are, for example, between 10 and 30 seconds, but higher or lower residence times may be used if desired.

Cyclohexanone oxime may conveniently be prepared, for example, by photooximation of nitrocyclohexane, which may itself be prepared by nitration of cyclohexane. Cyclohexanone oxime is itself a precursor of $\epsilon$-caprolactam and may be converted into $\epsilon$-caprolactam by means of a Beckmann rearrangement.

The desired chloropyridine(s) may be isolated from the reaction products by conventional techniques, for example by fractional distillation, fractional crystallization, solvent extraction or a combination of such techniques.

The invention is illustrated but not limited by the following Examples:

EXAMPLE 1

49.2 ml of a solution of $\epsilon$-caprolactam (11.3 g) in carbon tetrachloride (92.4 g) was fed at a rate of 0.7 ml/min to a packed vaporizer maintained at 320° C. The issuing vapors were passed to a vertical glass tubular reactor of 1-inch bore held at a temperature of 530° C ($\pm$ 10° C) where they were mixed with chlorine fed at a rate of 0.47 liter/min measured at 20° C. The gaseous feed to the reactor contained 6 moles of carbon tetrachloride and 18 moles of chlorine per mole of caprolactam; the residence time was 20 seconds. The gaseous reactor effluent was condensed and collected in cooled carbon tetrachloride. The resulting carbon tetrachloride solution was distilled to remove solvent and the residual solid was collected and analyzed by gas-liquid chromatography. The product contained pentachloropyridine 15.2 g (86 percent yield based on the caprolactam fed) together with 2,3,4,6- and 2,3,5,6-tetrachloropyridines. Recrystallization from carbon tetrachloride gave substantially pure pentachloropyridine.

EXAMPLE 2

49.2 ml of a solution of $\epsilon$-caprolactam (11.3 g) in carbon tetrachloride (92.4 g) was fed at a rate of 0.8 ml/min to a packed vaporizer maintained at 300° C. The issuing vapors were passed to a vertical glass tubular reactor of 1-inch bore held at a temperature of 400 ° C $\pm$ 10° C where they were mixed with chlorine fed at a rate of 0.57 liter/min measured at 20° C. The gaseous feed to the reactor contained 6 moles of carbon tetrachloride and 20 moles of chlorine per mole of caprolactam: the residence time was 10 seconds. The gaseous reactor effluent was condensed and collected in cooled carbon tetrachloride. The resulting carbon tetrachloride solution was distilled to remove solvent and the residual solid was collected and analyzed by gas-liquid chromatography. The product contained 2,6-dichloropyridine (68 percent yield based on the caprolactam fed) together with 2-chloropyridine (8 percent), 2,4,6-trichloropyridine (10 percent), 2,3,6-trichloropyridine (3 percent), 2,3,4,6-tetrachloropyridine (13 percent) and 2,3,5,6-tetrachloropyridine (1 percent).

EXAMPLE 3

46.6 ml of a solution of cyclohexanone oxime (11.3 g) in carbon tetrachloride (92.4 g) was fed at a rate of 0.7 ml/min to a packed vaporizer maintained at 300° C. The issuing vapors were passed to a vertical glass tubular reactor of 1-inch bore held at a temperature of 550° C ± 10° C where they were mixed with chlorine fed at a rate of 0.46 liter/min measured at 20° C. The gaseous feed to the reactor contained 6 moles of carbon tetrachloride and 18 moles of chlorine per mole of cyclohexanone oxime: the residence time was 10 seconds. The gaseous reactor effluent was condensed and collected in cooled carbon tetrachloride. The resulting carbon tetrachloride solution was distilled to remove solvent and the residual solid was collected and analyzed by gas-liquid chromatography. The product contained pentachloropyridine 4.8 g (24 percent yield based on the cyclohexanone oxime fed) together with 2,3,6- and 2,4,6-trichloropyridines and 2,3,4,6- and 2,3,5,6-tetrachloropyridines and hexachlorobenzene. Recrystallization from carbon tetrachloride gave substantially pure pentachloropyridine.

What we claim is:

1. A process for the manufacture of a chloropyridine which comprises interacting $\epsilon$-caprolactam with chlorine in the vapor phase at a temperature of at least 250° C.

2. A process as claimed in claim 1 wherein the proportion of chlorine is at least 5 moles of chlorine per mole of caprolactam.

3. A process as claimed in claim 2 wherein the proportion of chlorine is at least 10 moles per mole of caprolactam.

4. A process as claimed in claim 3 wherein the proportion of chlorine is from 15 to 30 moles per mole of caprolactam.

5. A process as claimed in claim 2 wherein the reaction temperature is in the range from 400° to 600° C.

6. A process as claimed in claim 2 wherein the reaction is carried out in the presence of a diluent.

7. A process as claimed in claim 6 wherein the diluent is carbon tetrachloride.

* * * * *